United States Patent
Balian

(10) Patent No.: US 12,213,413 B2
(45) Date of Patent: Feb. 4, 2025

(54) ROBOTIC PRUNING APPARATUS

(71) Applicant: Missak Sarkis Balian, Pasadena, CA (US)

(72) Inventor: Missak Sarkis Balian, Pasadena, CA (US)

(73) Assignee: Missak Sarkis Balian, Pasadena, CA (US)

( * ) Notice: Subject to any disclaimer, the term of this patent is extended or adjusted under 35 U.S.C. 154(b) by 215 days.

(21) Appl. No.: 17/805,409

(22) Filed: Jun. 3, 2022

(65) Prior Publication Data

US 2022/0386537 A1  Dec. 8, 2022

Related U.S. Application Data

(60) Provisional application No. 63/196,495, filed on Jun. 3, 2021.

(51) Int. Cl.
*A01G 23/095* (2006.01)
*A01G 3/08* (2006.01)

(52) U.S. Cl.
CPC ......... *A01G 23/0955* (2013.01); *A01G 3/085* (2013.01)

(58) Field of Classification Search
CPC .................................................. A01G 23/0955
See application file for complete search history.

(56) References Cited

U.S. PATENT DOCUMENTS

| | | | | |
|---|---|---|---|---|
| 6,474,377 B1* | 11/2002 | Van De Mortel | .. | A01G 23/0955 47/1.01 R |
| 6,672,346 B1* | 1/2004 | Heckmaier | ........ | A01G 23/0955 47/1.01 R |
| 7,997,311 B2* | 8/2011 | Prout, Jr. | ................. | A01G 7/06 144/208.2 |
| 8,307,865 B1* | 11/2012 | Cuffel | ................ | A01G 23/0955 144/24.1 |
| 8,517,066 B1* | 8/2013 | Van De Mortel | ......... | B27L 1/06 144/24.13 |
| 2007/0181217 A1* | 8/2007 | Ahdoot | .............. | A01G 23/0955 144/24.13 |
| 2009/0277536 A1* | 11/2009 | Scott | ................... | A01G 23/0955 144/24.13 |
| 2013/0284869 A1* | 10/2013 | Helenius | ................ | A01G 23/08 144/343 |

* cited by examiner

*Primary Examiner* — Matthew Katcoff
(74) *Attorney, Agent, or Firm* — KPPB LLP

(57) ABSTRACT

A robotic pruning apparatus that can be adapted to fit around a variety of trees and can move along the length of the tree while performing a variety of pruning operations. The pruning apparatus can be configured with a variety of different cutting heads that have multiple degrees of freedom of movement such that they can be used to perform any number of cutting operations along the length of the tree. The apparatus can be remotely operated by a human or can be autonomous or semi-autonomous.

18 Claims, 8 Drawing Sheets

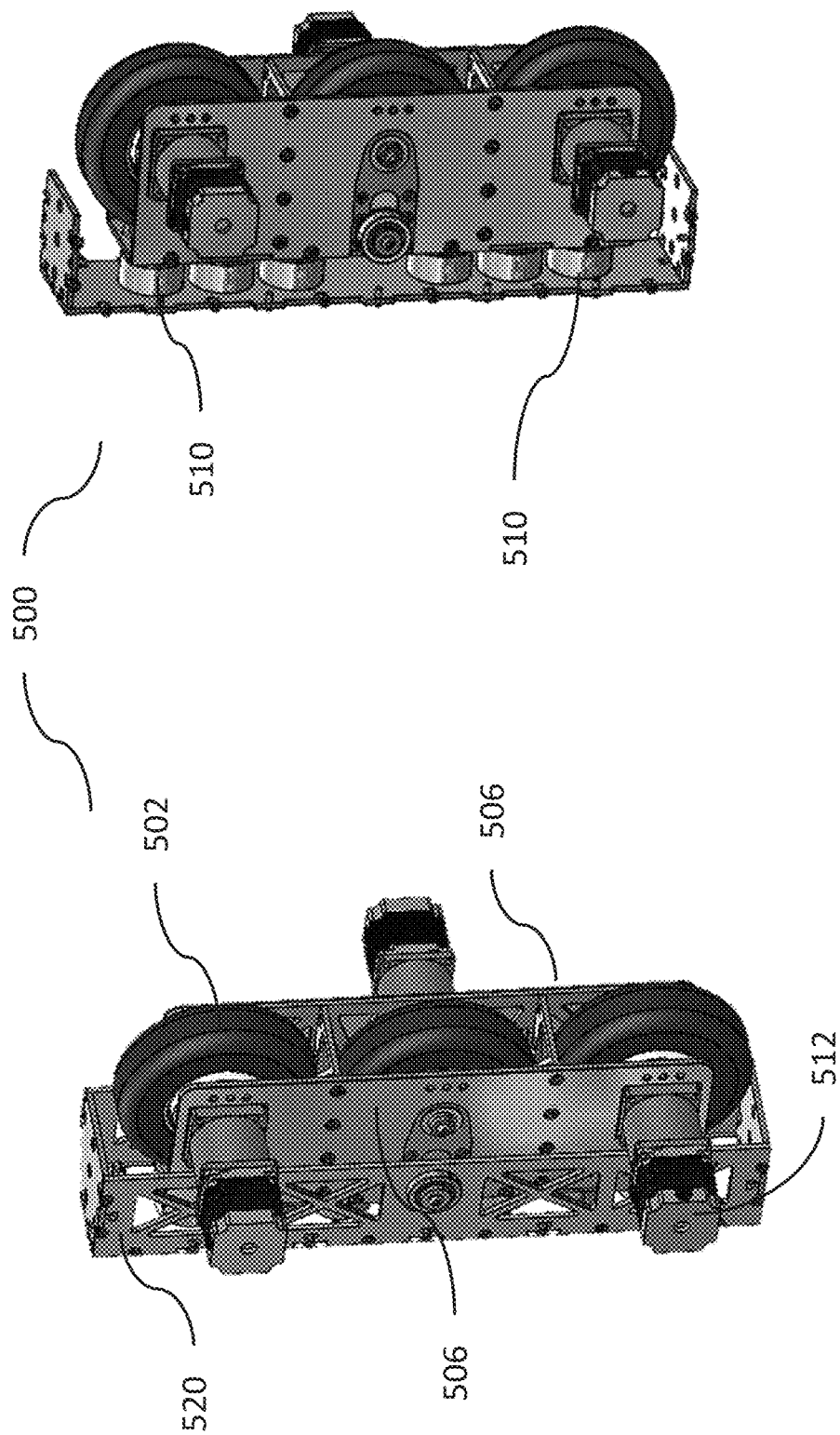

ROBOTIC PRUNING APPARATUS

CROSS-REFERENCED APPLICATIONS

This application claims priority to U.S. Provisional applications 63/196,495 filed on Jun. 3, 2021. The disclosure of which is included herein by reference in its entirety.

FIELD OF THE INVENTION

The present invention relates to systems and methods for trimming and/or pruning trees. More specifically, the present disclosure is related to a robotic pruning apparatus designed for trimming, cutting, decoration, and modification of palm trees.

BACKGROUND OF THE INVENTION

In the process of palm tree growth, palm trees grow foliage called fronds at the top of the plant. As new fronds grow higher on the tree, old fronds turn brown or die. These dying fronds adversely affect the aesthetics of the tree. Moreover, the fronds commonly fall off, reduce visibility of sidewalks or roads, pose a risk in high wind, and pose a significant fire hazard. Due to these issues, palm trees must be periodically pruned to remove any dead or dying fronds. During pruning, fruits or flowers may be removed, and additional work may be conducted to make the palm tree more aesthetically pleasing. The removal of dead or dying prunes can also improve the health of the tree by ensuring that available nutrients are put towards healthy fronds and allow any disease or at-risk parts of the plants to be removed. In other types of trees, the growth of branches, leaves, and other foliage can create typical hazards and problems.

Tree pruning is typically dangerous and traditionally requires personnel to manually climb the tree and operate hazardous equipment such as pruners, shears, and chainsaws. In order to reach sufficient height to trim the tree, pruning operators can utilize a variety of methods, including ladders, stepstools, tools with extensions, and man or scissor-lifts to gain access to the upper parts of the tree. Accordingly, traditional methods and tools for pruning trees can pose a greater risk to both operator and tree.

SUMMARY OF THE INVENTION

In some aspects, the techniques described herein relate to a robotic tree pruning apparatus including: A circular support structure, having an external surface and an internal surface, wherein the internal surface forms a central open cavity that extends from an upper surface to a lower surface of the circular support structure along a central axis; A plurality of climbing assemblies, each of the plurality of climbing assemblies having an elongated body and disposed circumferentially within the circular support structure running parallel to the central axis, wherein each of the plurality of climbing assemblies has a plurality of climbing elements vertically disposed within the elongated body and configured to contact a climbing surface; A at least one pruning device, wherein the at least one pruning device is disposed on the the circular support structure, where the at least one pruning device has at least one cutting head and wherein the at least one pruning device is movable at least one degree of freedom.

In some aspects, the techniques described herein relate to a robotic pruning apparatus, wherein the circular support structure has a plurality sections wherein each section is connected to at least one other section at at least one pivot, hinge, or connection point.

In some aspects, the techniques described herein relate to a robotic pruning apparatus, wherein the circular support structure has an open configuration where each of the plurality of sections are pivoted away from each other and the central cavity is exposed and a closed configuration wherein each of the plurality of sections are interconnected at each of the pivot points wherein the central cavity is closed.

In some aspects, the techniques described herein relate to a robotic pruning apparatus, further including at least one locking mechanism, wherein the at least one locking mechanism has an engaged position where a portion of the locking mechanism is interconnected with a locking element and wherein the locking mechanism has a disengaged position where the portion of the locking mechanism is disconnected from the locking element.

In some aspects, the techniques described herein relate to a robotic pruning apparatus, wherein the locking element is a pin, cam-locking mechanism, or latch.

In some aspects, the techniques described herein relate to a robotic pruning apparatus, wherein each of the plurality of climbing elements is a wheel with a wheel hub that has a center axis hole and wherein the wheel hub has a climbing element on the external portion of the wheel hub such that the climbing element has a contact surface is configured to contact the surface of a tree.

In some aspects, the techniques described herein relate to a robotic pruning apparatus, wherein each of the plurality of climbing elements is connected to a drive motor wherein the drive motor has a central shaft connected to the center axis hole and is configured to drive the rotational movement of the climbing elements such that the robotic pruning apparatus can move along the surface of a tree.

In some aspects, the techniques described herein relate to a robotic pruning apparatus, wherein the climbing element is selected from a group consisting of a rubber component and a pronged element.

In some aspects, the techniques described herein relate to a robotic pruning apparatus, further including a plurality of tensioners connected to each of the plurality of climbing assemblies and configured to generate a pre-load on each of the plurality of climbing assemblies such that each of the plurality of climbing assemblies can maintain continuous or partial contact with a tree.

In some aspects, the techniques described herein relate to a robotic pruning apparatus, wherein each of the plurality of tensioners is selected from a group consisting of passively controlled tensioners and actively controlled tensioners.

In some aspects, the techniques described herein relate to a robotic pruning apparatus, wherein each of the plurality of tensioners are selected from a group consisting of electric, hydraulic, pneumatic, and spring.

In some aspects, the techniques described herein relate to a robotic pruning apparatus, wherein the circular support structure includes a plurality of structural support plates, and wherein each of the structural support plates is separated by a plurality of support spacers such that the plurality of support plates and support spacers form the circular support structure.

In some aspects, the techniques described herein relate to a robotic pruning apparatus, further including a gearing assembly disposed on an upper support plate, wherein the gearing assembly has an inner gear and an outer ring; a drive motor with a drive gear that cooperatively engages with the inner gear; and wherein the at least one pruning device is disposed on the gearing assembly such that when the drive motor and drive gear engages with the inner gear the at least one pruning device rotates circumferentially about the central axis. In other aspects, a similar assembly is made up of a toothless gear and friction drive that is connected to a motor.

In some aspects, the techniques described herein relate to a robotic pruning apparatus, further including a cover plate that covers the gearing assembly, and/or the climbing assemblies to prevent exposure to debris.

In some aspects, the techniques described herein relate to a robotic pruning apparatus, wherein the at least one pruning device has a pruning drive motor configured to move the pruning elements along an axis that is perpendicular to the central axis.

In some aspects, the techniques described herein relate to a robotic pruning apparatus, wherein the pruning drive motor has a drive motor housing that covers the drive motor and protects the drive motor from debris.

In some aspects, the techniques described herein relate to a robotic pruning apparatus, wherein the at least one pruning device has a pruning element cover that protects the pruning element from debris.

In some aspects, the techniques described herein relate to a robotic pruning apparatus, wherein the at least one pruning device includes a pruning head supply system, such that the at least one pruning device can utilize one or more pruning heads to perform one or more pruning functions.

In some aspects, the techniques described herein relate to a robotic pruning apparatus, wherein the pruning heads are selected from a group consisting of spindles, rotating mils, a laser source, a rotating saw blade, a reciprocating saw blade, chainsaw blades, cutting shears, a rotating wire, and a bladed cutting tool.

In some aspects, the techniques described herein relate to a robotic pruning apparatus, wherein the supply system has an outer housing that protects the supply system from debris.

In some aspects, the techniques described herein relate to a robotic pruning apparatus, further including a plurality of sensors and controllers electronically connected to each of the climbing assemblies and the at least one pruning device such that the plurality of sensors and controllers can autonomously operate the movement of the apparatus along a tree and a variety of pruning operations performed by the at least one pruning device.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein:

FIGS. 5A through 5D illustrate conceptual views of a climbing assembly in accordance with embodiments.

DETAILED DISCLOSURE

Figure 1A:
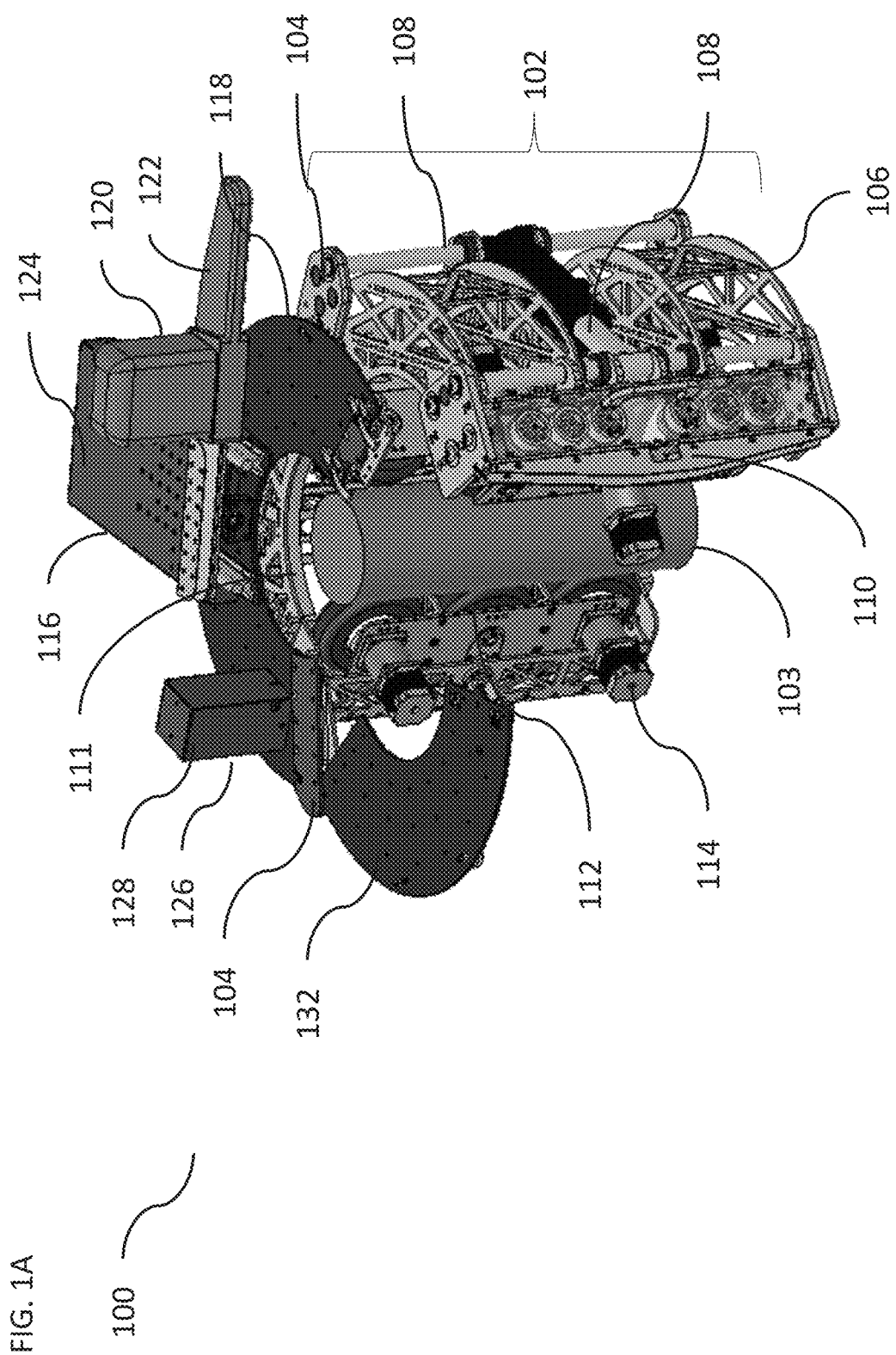
FIG. 1A illustrates a conceptual view of a robotic pruning apparatus in accordance with embodiments.

Many embodiments are directed to a robotic pruning apparatus that is configured to automatically ascend a tree for pruning. In many embodiments, the apparatus has a plurality of climbing surfaces that are circumferentially disposed on a circular support structure. Each of the climbing surfaces can be positioned parallel to the central axis of a tree and is configured to be in contact with the outer surface of the tree. The support structure, in many embodiments, can be adaptable to fit around a variety of different sized trees. Additionally, each of the climbing surfaces can adapt to a changing diameter of any number of trees. In numerous embodiments, the support structure can support one or more pruning devices such as a saw or clippers. Additionally, many embodiments of the pruning apparatus can implement a number of different sensors and actuators to control the movement of the apparatus along the length of the tree as well as control the various types of cutting devices. In some instances, the device can be remotely controlled by a human operator. Other embodiments can have a computer to autonomously or semi-autonomously control the movement and cutting operation of the device. This can be advantageous to both the human operator as well as the tree by ensuring that the operator is safe and the tree is properly pruned for continued healthy growth.

Traditional tree pruning operations, as previously described, are done with a human operator that manually has to ascend the tree to the height necessary to prune. Operators can use a number of different methods to ascend, including ladders, stools, lifts etc. to gain access to the upper parts of the tree. Such methods tend to pose a risk to operators.

Some developments in this area have been mode to help remove the operator from actually ascending the tree. Most devices utilize a motorized system that spirals up the trunk of the tree with a saw or other cutting element to simply cut the branches that are in the path of the device. These systems fail to provide any feedback or system of effectively pruning a tree to prevent damage. Furthermore, such systems fail to properly prune the tree but rather provide a mere bulk cutting operation that cuts off anything in the path of the tool. It cannot be used for precision pruning as would be required to maintain the health of any tree.

The systems and methods described herein are directed to a Robotic Pruning Apparatus and associated methods that improve the pruning process for a variety of trees including palm trees. This is done by employing a variety of pruning and other tools on a multi-degree-of-freedom robotic system. In accordance with many embodiments, the Robotic Pruning Apparatus can be completely computer controlled having a number of different sensors and/or actuators that control the movement of the device along the length of the tree as well as control the numerous cutting and pruning devices. Other embodiments may be computer-assisted, whereby an operator controls the system remotely with the aid of computer-control. Accordingly, it can be appreciated that the systems and methods described herein can be implemented in a number of different embodiments. For example, many embodiments may implement a number of different systems and subsystems to control the device as well as effectuate the purpose of the device in pruning the palm tree Turning now to the drawings, FIGS. 1A and 1B conceptually illustrate an embodiment of a tree pruning apparatus 100 that has a main structure 102 that is adaptable to a tree 103. The main structure 102 can be constructed of any material such as metal or any material that is suitable to support the additional components on the apparatus 100. In many embodiments, the main structure can be generally circular in shape and can open about one or more pivot points 104 such that the main structure can be enclosed around a tree 103. The main structure 102 can have a number of different structural components such as support plates 106, and elongated support spacers 108. The support spacers 108, in some embodiments, can help to separate and support the support plates 106 as well as other components on the main structure.

In accordance with many embodiments, the main structure 102 can be configured to support a plurality of climbing assemblies 110. The climbing assemblies 110 can be located concentrically about a center orifice or channel 111 that runs between the plurality of support plates 106. In other words, each of the plurality of support plates 106 are a circular plate with a hole in the center thereof that is sufficient to surround a tree 103. In some embodiments, the support plates can be multiple parts or portions of a circular structure that can be joined. As previously mentioned, many embodiments of the structure can use spacer elements 108 to separate the support plates 106. This configuration can allow for the placement of the climbing assemblies 110. As can be appreciated, the number of support plates 106 can vary depending on the size and number of climbing assemblies. The climbing assemblies 110 can be used to propel the pruning apparatus along the trunk of the tree 103 in an upward or downward direction depending on if the device is beginning or ending an operation. Although it will be more fully described in relation embodiments of the climbing assemblies 110, many embodiments of the assemblies 110 can have a number of wheels 112 or other devices that can be in direct contact with the tree 103. Each set of wheels on the climbing assemblies 110 can be controlled by one or more motors 114. The motors 114 can be selected from any suitable motor capable of generating movement in the wheels 112 of the climbing assemblies 110. In various embodiments, the climbing assemblies 110 can act as additional support elements by serving as attachment points for the support plates 106. This is especially true when the support plates 106 are broken into multiple portions. In other words, the portions of the support plates 106 can be connected to each of the climbing assemblies 110 to create the overall support structure 102, in accordance with some embodiments.

Many embodiments of the apparatus 100 can have one or more pruning elements 116 connected to a top plate 118. The pruning elements 116 can be controlled by one or more motor assemblies (not shown). In some embodiments, the motor assemblies can be covered by a housing element 124 that protects the motor assembly from damage as the tree is pruned and/or trimmed. Likewise, the pruning elements 116 can have pruning housings 120 that similarly protect the pruning elements 116 from damage. In some embodiments, the pruning elements 116 can have a supply device 122 mounted to the top plate 118. The supply device 122 can provide a variety of different pruning head (not show) that can be interchanged with the pruning device 116 for performing any number of cutting or drilling type operations. It can be appreciated, that some embodiments of the supply device can have a number of different cutting subsystems including things like spindles, rotating mils, a laser source, a rotating saw blade, a reciprocating saw blade, chainsaw blades, cutting shears, a rotating wire, a bladed cutting tool, or any other suitable tool for use in pruning operations.

In many embodiments, the pruning elements 116 can have more than one degree of freedom or be configured to move about more than one axis. For example, the pruning elements 116 can be configure to move perpendicular to the central axis of the tree and/or pruning apparatus. The pruning device 116 can be positioned at any desirable distance from the tree 103 so that it can engage with the portions of the tree that need to be removed. Additionally, the pruning elements and/or the entire top plate 118 can be moved or rotated around the tree 103 by a separate upper drive motor 126 that likewise can be covered by a protective housing 128. This can allow for a more efficient method of pruning the tree, because the climbing assemblies will not need be set up for rotational movement as well as climbing. Additionally, only a portion of the apparatus would need to move or rotate about the tree 103 during the pruning operations. This minimizes the energy needed to perform the pruning operations.

Figure 1B:
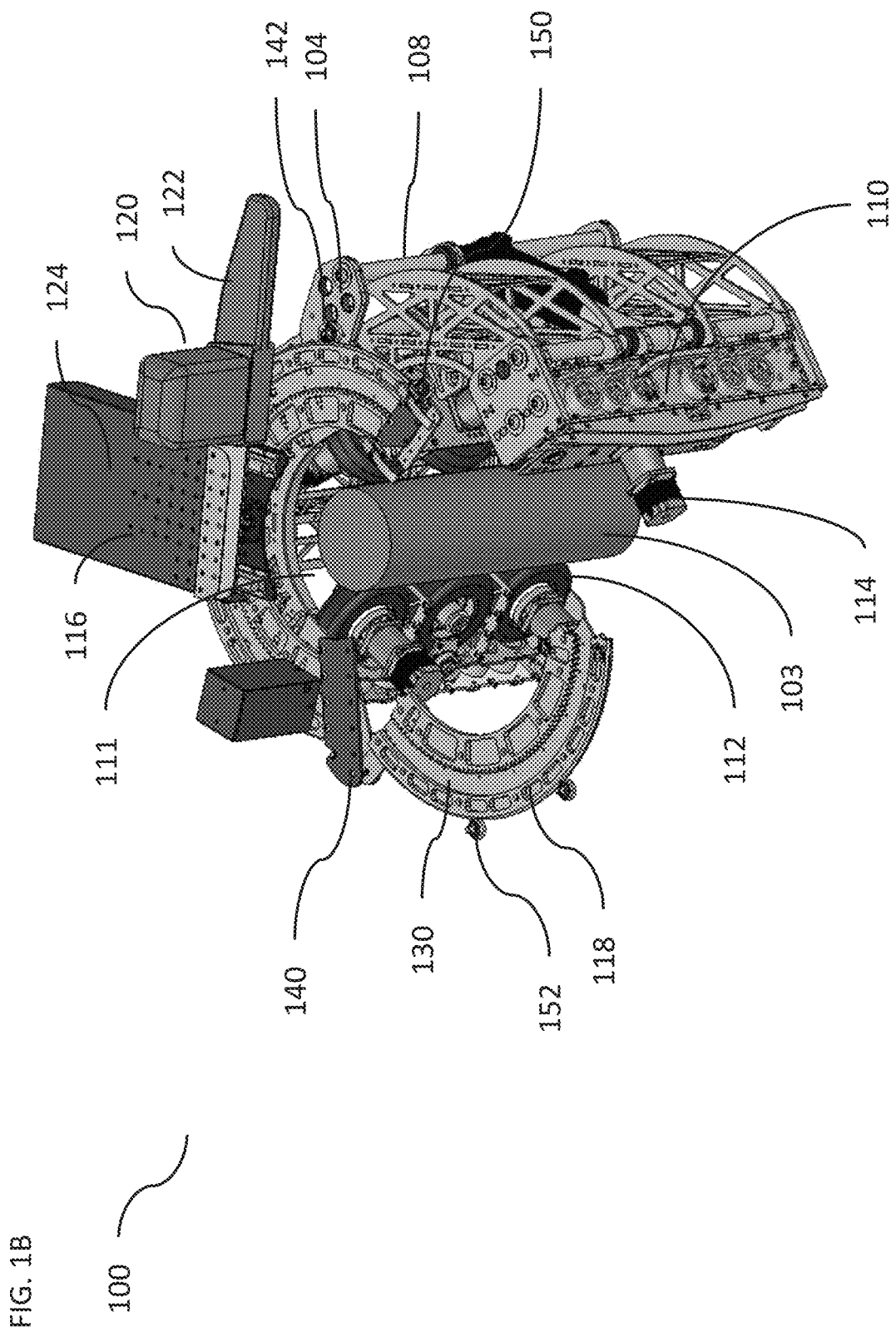
FIG. 1B illustrates a conceptual view of a a robotic pruning apparatus in accordance with embodiments.

Although not fully illustrated in FIGS. 1A and 1B, it can be appreciated that the rotation of the top plate 118 will require some type of mechanical structure to create the rotation of the top plate 118. This can be done by any number of suitable device and/or structure; such as a gearing system 130 that can cause the rotation of the top plate 118. Accordingly, the gearing system 130 would need to be adequately protected from wood chips or other debris that could clog the gearing system 130 and prevent the movement of the top plate 118. As such, many embodiments of the top plate 118 can have a cover 132, as illustrated in FIG. 1A. FIG. 1B illustrates the apparatus 100 without the top plate cover 132, fully exposing a version of a gearing system.

In accordance with many embodiments, the top plate 118 can be separated into several sections or components that can rotate away from the tree 103 and allow the apparatus to be secured around the trunk of a tree 103. Accordingly, many embodiments can have multiple hinge points or pivot points 140 and 142 that allow the sections to pivot away from the tree 103. Additionally, each section can be configured to cooperatively engage with another section such that the top plate 118 can be completely secure when the apparatus 100 is around a tree 103. This will allow for better rotational function of the various cutting elements.

The top plate and other rotational elements can be locked into place by several means. First, many embodiments can have locking mechanisms or latches 150 that can help to join the various sections together. Additionally, once the assembly is completely secured around the tree 103, wheel bearings 152 can be connected to the top plate cover 132 that allow the top plate cover to rotate as well as provide a circumferential force against the top plat 118 and hold it in place during cutting operations.

Figure 2:
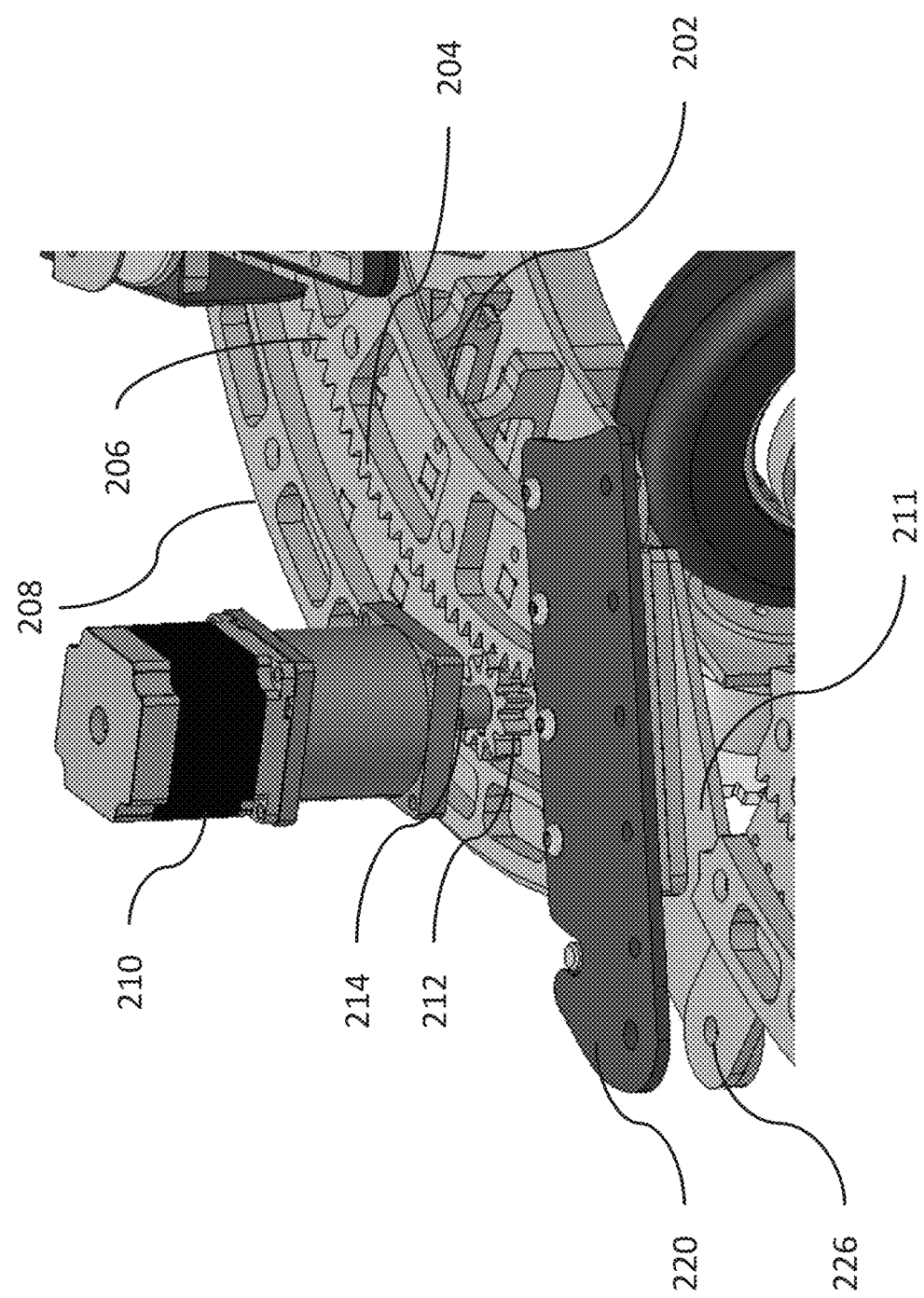
FIG. 2 illustrates a conceptual view of an upper plate of a robotic pruning apparatus in accordance with embodiments.

As previously discussed with respect to FIGS. 1A and 1B, many embodiments of the pruning apparatus can have a top plate component that houses or supports a variety of elements. For example, FIG. 2 illustrates a view of a top plate element 202 with an exposed gearing system 204. The gearing system 202 can have an inner gear 206 and an outer gearing ring 208, where the outer gearing ring 208 is concentric to the inner gear 206 and has a diameter greater than that of the inner gear 206. Additionally, the gearing system can engage with a drive motor 210 that has a drive gear 212 located on a drive shaft 214 and engages directly with the inner gear 206. In some embodiments of the gearing system 204, the inner gear may be fixed and the outer gear ring 208 can rotate such that when the drive gear 212 moves it will drive the rotational movement of the outer gearing ring 208 and subsequently any components that may be connected thereto, such as the drive motor 210. The inner gear can be fixed to a plate 211 by any number of means such as fasteners or welding. Additionally, the outer gearing ring 208 can be connected to a plate or the same plate by a number of methods that allow for it to move or rotate on the surface of the plate, such as bearings or wheels etc. In some embodiments the outer gearing ring can be held in place by a number of bearings located on the circumference of the outer bearing ring and fixed to the plate 211.

As was previously described with respect to FIGS. 1A and 1B, many embodiments of the pruning apparatus can have a number of pivot points by which one or more portions of the apparatus can be opened up or adjusted to fit around the circumference of a tree. Accordingly, FIG. 2 further illustrates that some embodiments can have one or more pivot plates 220 that can have alignment pins. Additionally, the pivot plates 220 can be secure and pivot about one of the pivot points 226 similar to those discussed in FIGS. 1A and 1B. As can be appreciated, the pivot plates 220 illustrated in FIG. 2 illustrate an embodiment and that such mechanisms can take on any suitable configuration and be made from any suitable material such that they can allow the apparatus to operate in multiple configurations, including an open and closed.

Figure 3:
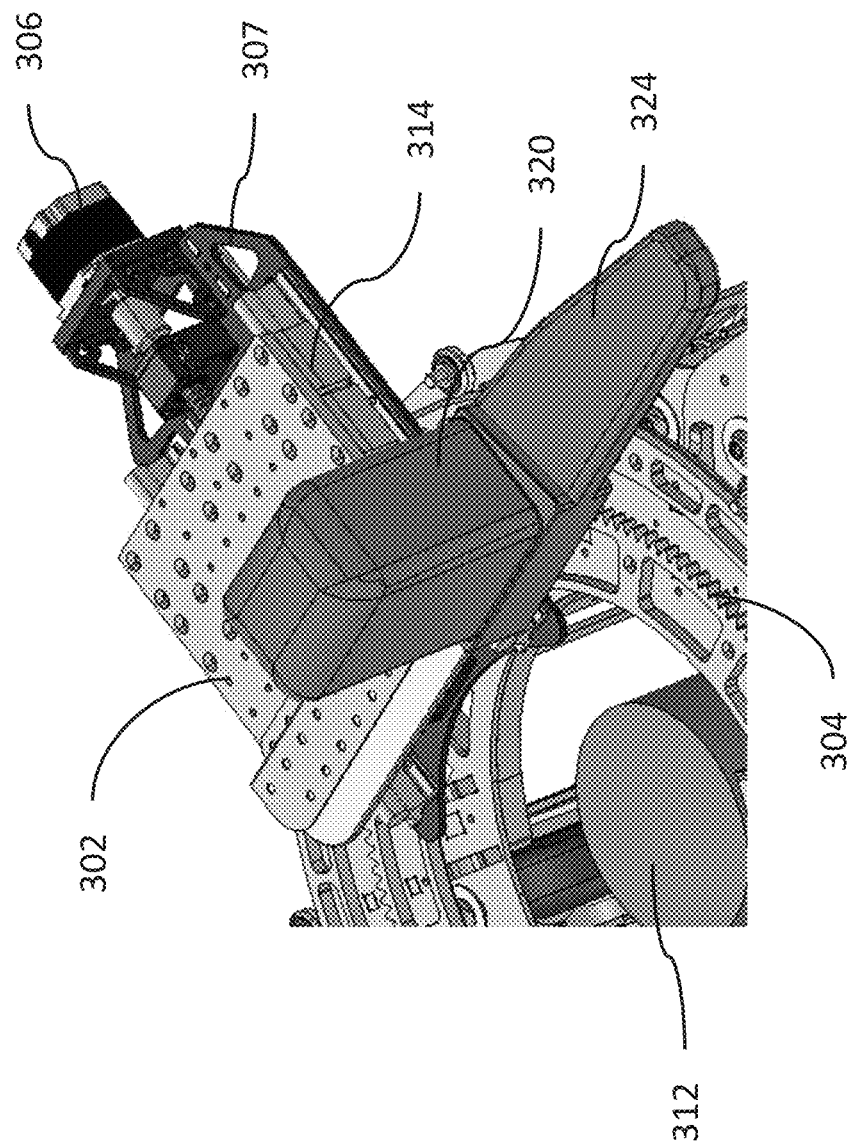
FIG. 3 illustrates a conceptual view of a pruning element in accordance with embodiments.

FIG. 3 further illustrates a position of one or more pruning devices 302 disposed on top of a rotational gearing ring 304. In many embodiments, the pruning devices can include, saws, cutters, or any other suitable tool that can be used for pruning. Some embodiments may configure the pruning devices into one or more assemblies that are attached to the rotational gearing ring 304 and the assemblies can include one or more drive motors 306 that are used to drive or power the movement of the various pruning devices 302. In various embodiments, the assemblies and/or the pruning device can be attached to the rotational gearing ring by a support plate 307. The pruning devices 302 can be set upon the rotational gearing ring 304 such that they have unhindered access to a tree 312 and can move close to and away from the tree 312 to prune or cut the desired sections of the tree. In some embodiments, the pruning devices and/or the drive motors can have housings 314 that protect the pruning device from debris.

As can be appreciated, the pruning of a tree can require more than one type of cutting element or tool to perform a variety of functions. In some embodiments, the pruning device 302 can have be connected to or work in cooperation with a tool supply system 320. The tool supply system 320 can have a variety of tools such as spindles, rotating mils, a laser source, a rotating saw blade, a reciprocating saw blade, chainsaw blades, cutting shears, a rotating wire, a bladed cutting tool, or any other suitable tool for use in pruning operations. In some embodiments, the tool supply system 320 can have a housing 324 that protects the supply system 320 from debris.

Although various embodiments illustrate one or more pruning devices disposed on a top surface of the pruning apparatus, it can be appreciated that some embodiments may position the pruning devices in different locations on the apparatus. For example, some embodiments may place the pruning devices within the body of the apparatus or on the bottom of the apparatus.

Figure 4:
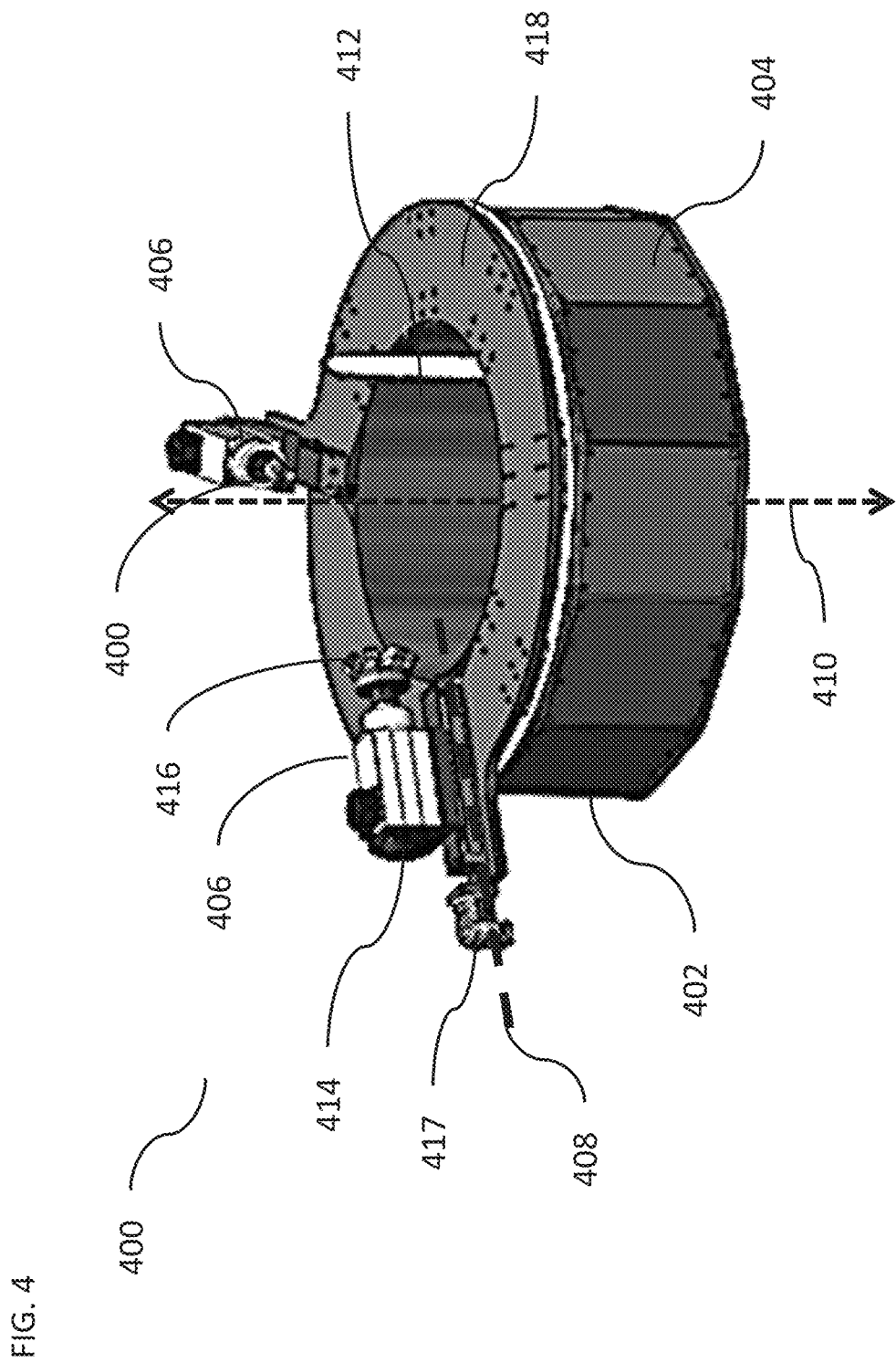
FIG. 4 illustrates a conceptual view of a pruning apparatus in accordance with embodiments.

FIG. 4 illustrates an alternative embodiment of the pruning devices that can be used in a pruning apparatus. For example, in some embodiments the pruning apparatus 400 can have an enclosed structural body 402 that houses the various climbing assemblies (not shown). Similar to covering the motors, pruning devices and gearing systems, the coverings 404 can help to protect the various components such as drive motors, computer controllers, sensors etc. Additionally, many embodiments of the pruning apparatus 400 can have one or more cutting or pruning elements 406 located on an upper portion of the apparatus 400. The pruning elements 406 can be configured to move in one or more directions. For example, in various embodiments, the pruning elements 406 can move along an axis 408 perpendicular to that of a central axis 410 of the apparatus. This can allow each of the pruning elements 406 to move towards and away from a tree (not shown) that may sit in the central channel 412 of the apparatus. Additionally, the pruning elements 406 can rotate circumferentially about the central axis 410 to gain access to different portions of the tree. In many embodiments, the pruning element 406 can have a motor 414 that drive the head 416 of each of the pruning elements. Additionally, the movement of each of the pruning elements 406 can be driven by one or more drive motors 417 that move the pruning element in one or more directions.

As can be appreciated the position of each of the pruning elements 406 can be in a fixed position on the upper ring 418 or be moveable such that their position can vary or change depending on the tree type being pruned. Additionally, it can be appreciated, that the head 416 of each of the pruning elements can be interchangeable to allow for different cutting or pruning heads to be used. This can be advantageous in many ways because it can allow for the apparatus 400 to be adaptable for a variety of trees.

Embodiments of the Climbing Systems

Figure 5A:
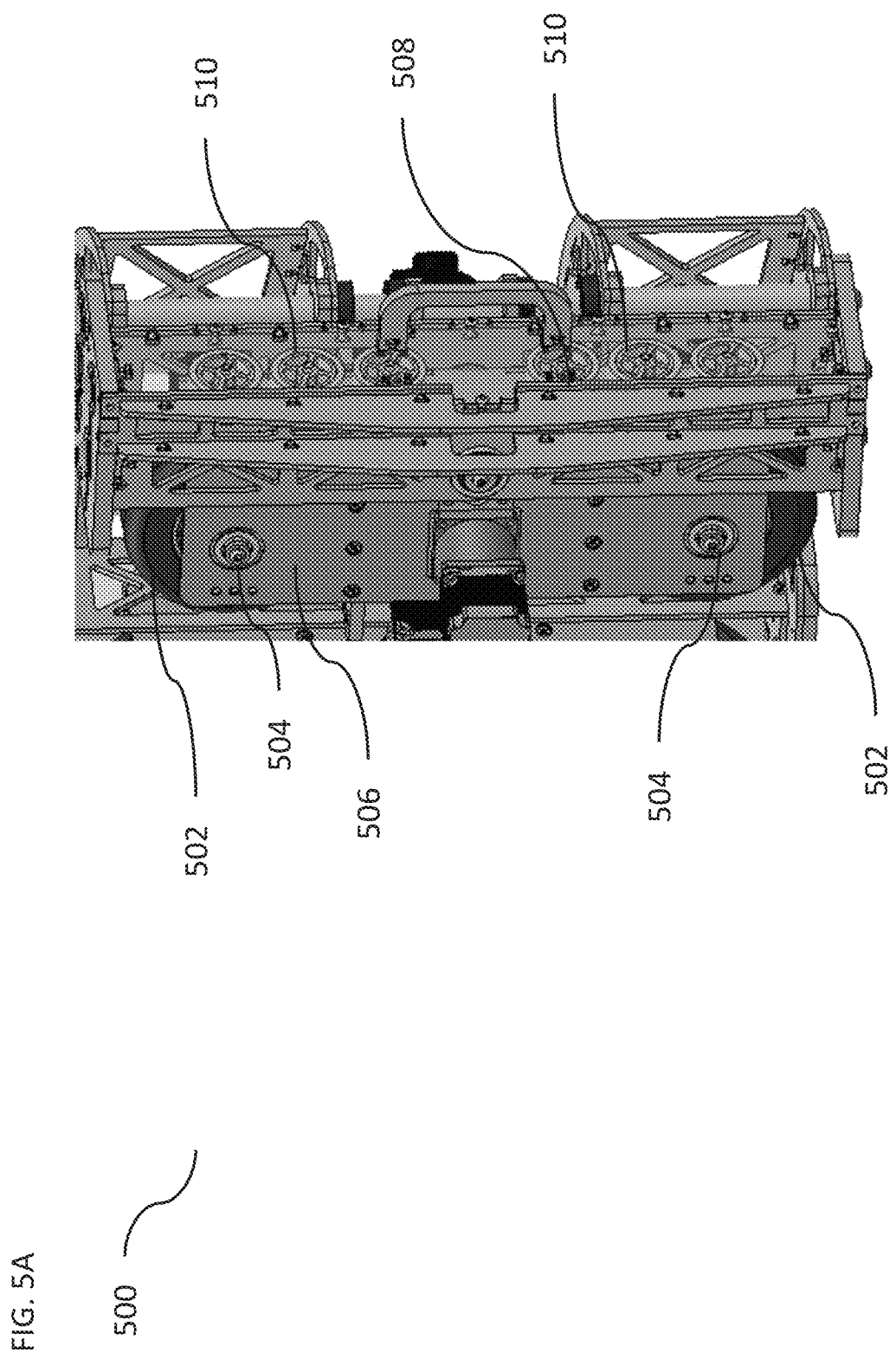

Turning now to FIGS. 5A through 5D, embodiments of climbing assemblies that can be used in a number of embodiments of a pruning apparatus are illustrated. For example, FIG. 5A illustrates an embodiment of a climbing assembly 500 that can be used in a pruning apparatus. In many embodiments, the assembly 500 can have a number of wheels 502 that are vertically aligned such that the rotational axis 504 of each wheel is parallel. Some embodiments can have two or more wheels 502. In many embodiments, the wheels 502 can be contained by a bracket 506 or multiple brackets that hold the wheels 502 in a position with respect to support structure 508. The support structure 508 can be set up to support the bracket 506 and wheels as well as a number of tensioners 510. As can be readily appreciated the specific configuration of the climbing assemblies 500 can vary and necessarily would vary or be adjustable give the ever changing configurations of trees. As such many embodiments can have a variety of different motors and tensioners that allow one or more wheels 502 to be in contact with the tree and can allow the assembly 500 to be real-time adjusted to accommodate for any change in the surface of the tree. This can be accomplished by any number of different controllers and sensors.

The tensioners 510 can be used to pre-load the wheels 502 such that they can remain in contact with the tree surface for the duration of the operation. This will allow the system to climb nearly any tree and adapt to the changing surface of the tree. It can be appreciated that the term tensioner refers to any device that is capable of pre-loading the wheels such as springs, pneumatic devices, and hydraulic devices. In various embodiments, the tensioners 510 can be individually controlled such that the pre-load on each of the respective wheels 502 can be adjusted independently from the other wheels 502. Accordingly, in many embodiments, the tensioners 510 can be controlled by any number of means. For example, some embodiments can control the tensioners 510 using passive control systems, while other embodiments use automated or actively controlled systems.

Figure 5B:
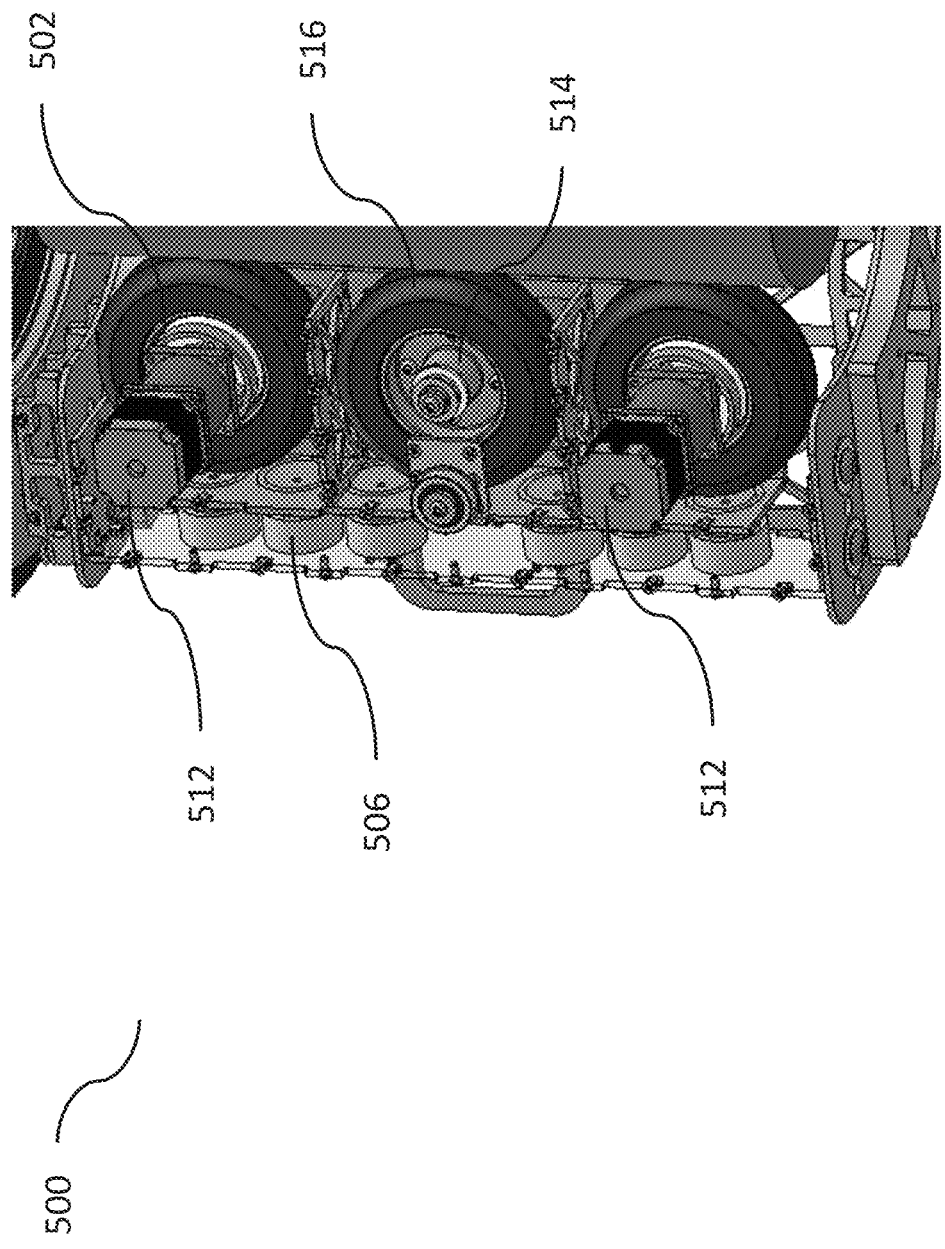

FIG. 5B illustrates an open view of a climbing assembly 500 with at least three wheels 502. In many embodiments, each of the wheels 502 can be connected to an independent drive motor 512. Each of the drive motors 512 can control the rotational movement of each of the wheels 502 independently. This can allow for each wheel 502 to help drive the movement of the pruning apparatus along the trunk of a tree. Each wheel 502 can have a hub 514 that is connected to the motor 512. The hub 514 can have a contact surface 516 that is designed to be in contact with the tree for climbing purposes. In some embodiments, the contact surface can be a rubber wheel. In other embodiments, the contact surface 516 can be prongs or spikes that extend outward from the hub such that the prongs or spikes come in contact with the tree. Although, each of the wheels 502 illustrated in FIG. 5B are the same, it can be appreciated that the wheels 502 can have different contact surfaces and each of the wheels can be pre-loaded to contact the tree at different times during different operations.

Turning now to FIGS. 5C though 5D, embodiments of the climbing assembly separate from the pruning apparatus and support structure can be seen. Similar to FIGS. 5A and 5B, FIGS. 5C through 5D can have one or more brackets 506 that hold and support the wheels 502 and the motors 512. In some embodiments, the assembly 500 can have an external support structure 520 that can support and contain each of the tensioners 510.

Embodiments of Control Systems

Since part of the concept of the various embodiments illustrated herein is to reduce the potential for human injury, it can be appreciated that many embodiments can be set up with one or more controllers and/or control systems to allow for the remote operation of the pruning devices. Although not specifically illustrated in FIGS. 1A through 5D, it can be appreciated, that the support structures and/or plates can be prime locations to secure the various types of controllers such as sensors, cameras, computers, etc. to allow for remote control of the device. Accordingly, many embodiments may also be configured with wireless transmitters that can transmit signals to and from the apparatus to a remote-control device such as a hand-held device. Additionally, some embodiments may have programmable control systems that can operate autonomously or semi-autonomously. This would remove most of the human interaction and allow the apparatus to ascend, detect, prune, and descend without or with very little human interaction.

Although various embodiments, can be configured to operate with human interaction or autonomously, it can be appreciated that some embodiments can be programmed to adapt or learn based on the environment and the number of pruning operations performed. As previously mentioned, the sensors and/or cameras that can be used to control the movement and pruning operations can record data for each pruning operation such that the data can be used in subsequent operations. Accordingly, the pruning apparatus can utilize the previous data to adapt and/or learn how to better prune or cut in the subsequent operations.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A robotic pruning apparatus comprising:
   a circular support structure, having an external surface and an internal surface, wherein the internal surface forms a central open cavity that extends from an upper surface to a lower surface of the circular support structure along a central axis;
   a plurality of climbing assemblies, each of the plurality of climbing assemblies having an elongated body and disposed circumferentially within the circular support structure running parallel to the central axis, wherein each of the plurality of climbing assemblies has a plurality of climbing elements vertically disposed within the elongated body and configured to contact a climbing surface;
   an at least one pruning device, wherein the at least one pruning device is disposed on the circular support structure, where the at least one pruning device has at least one pruning head and wherein the at least one pruning device is movable relative to the circular support structure;
   wherein the at least one pruning device comprises a pruning head supply device, configured such that the at least one pruning device can interchange the at least one pruning head with at least one other pruning head, such that the at least one pruning device can utilized more than one pruning heads to perform one or pruning functions by interchanging pruning heads;
   an at least one motor configured to drive the at least one pruning device, the at least one motor movable relative to the circular support;
   a gearing assembly disposed on an upper support plate, wherein the gearing assembly has an inner gear and an outer ring; a drive motor with a drive gear that cooperatively engages with the inner gear, wherein the at least one pruning device is disposed on the gearing assembly such that when the drive motor and drive gear engages with the inner gear the at least one pruning device rotates circumferentially about the central axis;
   wherein the at least one pruning device has a pruning drive motor configured to move the pruning elements along an axis that is perpendicular to the central axis.

2. The robotic pruning apparatus of claim 1, wherein the circular support structure has a plurality of sections wherein each section is connected to at least one other section at least one pivot point.

3. The robotic pruning apparatus of claim 2, wherein the circular support structure has an open configuration, where each of the plurality of sections are pivoted away from each other and the central open cavity is exposed; and a closed configuration wherein each of the plurality of sections are interconnected at each of the at least one pivot points wherein the central cavity is closed.

4. The robotic pruning apparatus of claim 3, further comprising at least one locking mechanism, wherein the at least one locking mechanism has an engaged position where a portion of the locking mechanism is interconnected with a locking element and wherein the locking mechanism has a disengaged position where the portion of the locking mechanism is disconnected from the locking element.

5. The robotic pruning apparatus of claim 4, wherein the locking element is a pin.

6. The robotic pruning apparatus of claim 1, wherein each of the plurality of climbing elements is a wheel with a wheel hub that has a center axis hole and wherein the wheel hub has a climbing element on an external portion of the wheel hub such that the climbing element has a contact surface that is configured to contact the surface of a tree.

7. The robotic pruning apparatus of claim 6, wherein each of the plurality of climbing elements is connected to a drive motor wherein the drive motor has a central shaft connected to the center axis hole and is configured to drive the rotational movement of the climbing elements such that the robotic pruning apparatus can move along the surface of a tree.

8. The robotic pruning apparatus of claim 6, wherein the climbing element is selected from a group consisting of a rubber component and a pronged element.

9. The robotic pruning apparatus of claim 1, further comprising a plurality of tensioners connected to each of the plurality of climbing assemblies and configured to generate a pre-load on each of the plurality of climbing assemblies such that each of the plurality of climbing assemblies can maintain continuous contact with a tree.

10. The robotic pruning apparatus of claim 9, wherein each of the plurality of tensioners is selected from a group consisting of passively controlled tensioners and actively controlled tensioners.

11. The robotic pruning apparatus of claim 9, wherein each of the plurality of tensioners are selected from a group consisting of hydraulic, pneumatic, and spring.

12. The robotic pruning apparatus of claim 1, wherein the circular support structure comprises a plurality of structural support plates, and wherein each of the structural support plates is separated by a plurality of support spacers such that the plurality of support plates and support spacers form the circular support structure.

13. The robotic pruning apparatus of claim 1, further comprising a cover plate that covers the gearing assembly to prevent exposure to debris.

14. The robotic pruning apparatus of claim 1, wherein the pruning drive motor has a drive motor housing that covers the drive motor and protects the drive motor from debris.

15. The robotic pruning apparatus of claim 1, wherein the at least one pruning device has a pruning element cover that protects the pruning element from debris.

16. The robotic pruning apparatus of claim 1, wherein the pruning heads are selected from a group consisting of spindles, rotating mils, a laser source, a rotating saw blade, a reciprocating saw blade, chainsaw blades, cutting shears, a rotating wire, and a bladed cutting tool.

17. The robotic pruning apparatus of claim 1, wherein the supply device has an outer housing that protects the supply system from debris.

18. The robotic pruning apparatus of claim 1, further comprising a plurality of sensors and controllers electronically connected to each of the climbing assemblies and the at least one pruning device such that the plurality of sensors and controllers can autonomously operate movement of the apparatus along a tree and a variety of pruning operations performed by the at least one pruning device.

* * * * *